United States Patent [19]

Collins

[11] 4,195,514

[45] Apr. 1, 1980

[54] ANALYZING EXHAUST GASES OF VEHICLE INTERNAL COMBUSTION ENGINES

[75] Inventor: Lars T. Collins, Mölndal, Sweden

[73] Assignee: Lars Collin Consult AB, Molndal, Sweden

[21] Appl. No.: 956,500

[22] Filed: Nov. 1, 1978

[30] Foreign Application Priority Data

Nov. 2, 1977 [SE] Sweden ................................. 7712354

[51] Int. Cl.$^2$ ........................................... G01M 15/00
[52] U.S. Cl. ..................................................... 73/116
[58] Field of Search ...................... 73/116, 117.3, 118, 73/117

[56] References Cited

U.S. PATENT DOCUMENTS

| 3,050,994 | 8/1962 | Heigl et al. | 73/117 |
| 3,999,425 | 12/1976 | Collin | 73/116 |

Primary Examiner—Jerry W. Myracle
Attorney, Agent, or Firm—Cantor and Singer

[57] ABSTRACT

When analyzing exhaust gases from vehicle internal combustion engines according to the simplified method, where the inertia and the internal losses of the engine are used as braking factors and the engine, during a given period of time, is subjected to a series of short incidents of fuel supply increases above idling speed level, it is important to ensure that all play is eliminated in the transmission path between the monitoring unit determining the fuel increase incidents and the fuel supply means. The fuel supply increase incidents should furthermore be selected so with respect to resulting changes in effective mean pressure (PME) and speed (RPM), that the fuel supply means, during each incident, will be displaced in a positive direction only, until the engine returns to the idling speed level.

2 Claims, 6 Drawing Figures

ANALYZING EXHAUST GASES OF VEHICLE INTERNAL COMBUSTION ENGINES

BACKGROUND OF THE INVENTION

In order to establish the content of undesirable emissions in the exhaust gases from a vehicle internal combustion engine, the engine is, during a given period of time, run according to a so called test cycle. This is intended to simulate a certain traffic sequence, and it will usually take about 30 minutes to run such a test. The vehicle will then have to be mounted upon a chassis dynamometer providing the necessary braking load.

Such testing necessitates the use of expensive equipment, and will furthermore waste a lot of time, as it not only is a question of passing through the cycle—the vehicle must be mounted upon and dismounted from the chassis dynamometer.

The inventor has already proposed a method and means suitable for use when analysing the exhaust gases from internal combustion engines, where a noticeable reduction in time is obtainable by using the inertia of the engine and its internal losses as the braking factor. This presupposes that the test cycle is composed of short acceleration and retardation incidents.

SUMMARY OF THE INVENTION

The present invention refers to a method which makes it possible to compare results obtained with equipment of the last mentioned type with any known test cycle. It will however be necessary to reduce the time scale in a representative manner.

An essential feature will then be to override any possible play in the transmission between the primary fuel control means and the member finally determining the amount of fuel, for instance the throttle valve of a carburettor.

The invention is characterized in that the fuel supply control means, before the first occasion of increased fuel supply, is adjusted to a zero position where all play is eliminated, and that the values of PME/RPM for each fuel increase incident are so selected, that the fuel supply control means, until it returns to the idling condition will be displaced in a positive direction only.

The reduction of the time scale is according to the invention obtained by drawing up, in a diagram, the changes in effective mean pressure (PME) in relation to speed (RPM) to which the engine is subjected when running through the selected cycle, statistically simplifying this diagram, so only a few, for instance six, mean value curves are obtained in which the extension in time for each RPM- and PME-level is used as a weighing factor, recalculating, based upon the knowledge of the moment characteristics of the actual engine at different speeds, the PME/RPM diagram to a fuel control means/time diagram, and making up a program for operating a monitoring unit actuating the fuel supply control means based upon last mentioned diagram.

DESCRIPTION OF A PREFERRED EMBODIMENT

Figure 1:
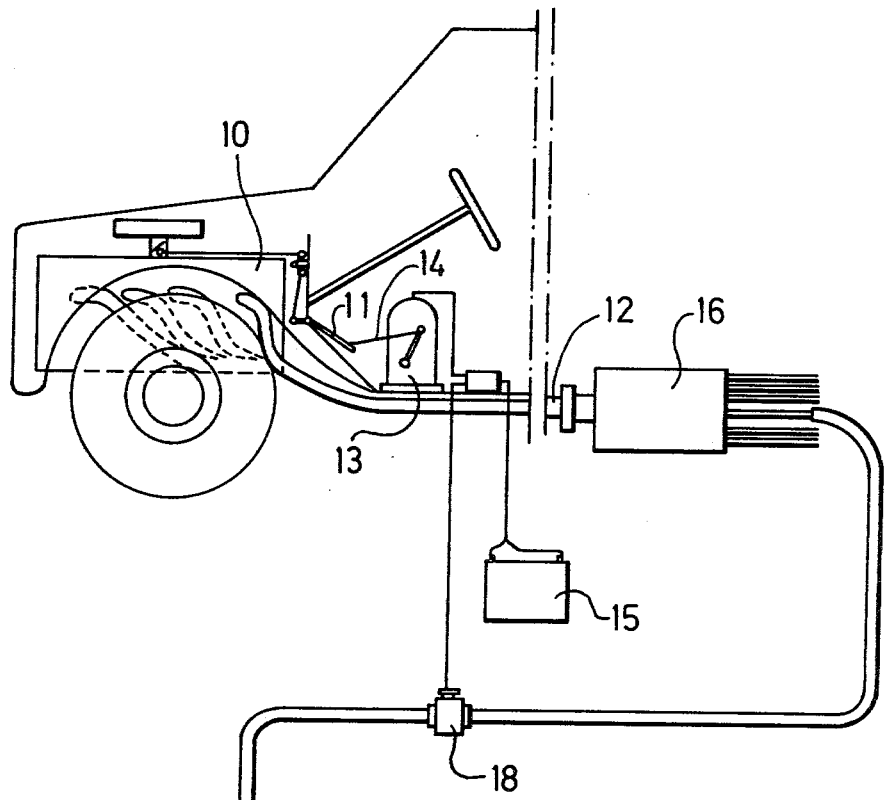
FIG. 1 very schematically shows the equipment used when running the test.

When performing exhaust gas tests at a vehicle engine, an equipment of the type schematically shown in FIG. 1 may be used. The vehicle is indicated by its front portion only, where the engine 10 is located. The supply of fuel is in a conventional manner determined by means of a gas pedal 11. The exhaust gases are conducted away by an exhaust pipe 12, including a silencer (not shown).

For the simplified test procedure, actual here, it will not be necessary to mount the vehicle upon a chassis dynamometer. The engine is run at idling speed, disengaged from the driving transmission. During a short period of time from, say, one half of a minute, up to a minute, which should be compared with thirty minutes usually required to run an established test cycle, the engine is subjected to a series of short incidents of variations in the fuel supply.

Each such incident has such a short duration that the engine, which, as mentioned above, is not subjected to any external load, will not attain any equilibrium condition at constant speed, but will be essentially accelerated and retarded only.

The gas pedal will, during the test, be operated by a motor 13, which is connected to the pedal by a linkage 14, and will provide a number of depressions of predetermined magnitude, spaced apart by intervals permitting the engine to return to the idling speed.

The motor is governed by a monitoring unit 15, and the programming thereof forms the background for the present invention.

On occasions it may be desirable to simulate also the conditions during cold starting. The testing sequence may therefore be selected so as to include pre-selected instances during the heating-up of the engine.

During the test a gas volume divider 16 is attached to the exhaust pipe 12, and a known portion of the total volume of gas is conducted to an analysing apparatus 17. The latter may be of any known type, and as it, by itself, does not have any influence upon the method according to the present invention, it is shown as a dotted line box only. In the conduit between gas distributor 16 and analysing apparatus 17, a valve 18 is provided, which is governed by monitoring unit 15 to open during the test only.

The equipment shown in FIG. 1 is an example only of the basic means necessary for performing the testing of exhaust gases from a disengaged vehicle engine, i.e. an engine operated without any external load.

In order to obtain an evaluation basis comparable with a desired, established test cycle it is necessary to reduce the time scale from about 30 minutes to less than one minute, while maintaining a corresponding, representative load upon the engine. It is evident that it will be necessary to produce, during a short moment of acceleration a composition of the exhaust gases, which corresponds with what is obtained during driving under load upon a chassis dynamometer.

Figure 2:
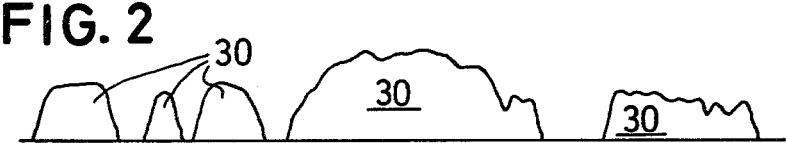
FIG. 2 shows a portion of an arbitrary, known test cycle.

FIG. 2 shows a portion of a typical test cycle diagram, which includes a number of "humps" 30 representing variations in the engine load during various moments of time. The theory behind such a test cycle is that it shall simulate a series of situations in the traffic, where the vehicle for instance is driven from a suburb into a big city, and is subjected to repeated accelerations and retardations, as well as varying up-grades and down-grades.

Figure 3:
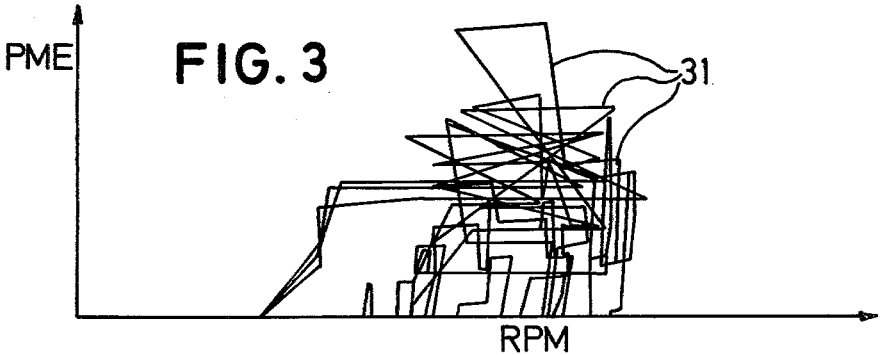
FIG. 3 is a diagram showing how the mean pressure (PME) of the engine varies with engine speed (RPM) during the test cycle.

FIG. 3 shows how a test cycle diagram according to FIG. 2 by computerization has been recalculated to represent changes in effective mean pressure (PME) in relation to engine speed (RPM). It should, however, be noted, that each "hump" in the diagram according to FIG. 2 may include one or more occasions of gear-shifting. The discontinuties during gear-shifting means that the engine speed does not necessarily increase all the time when the engine passes through a "hump", but may be reduced while the PME increases, and also that it may increase while the PME remains constant. Diverse load zones may be represented by spaced peaks along the speed scale.

Figure 4:
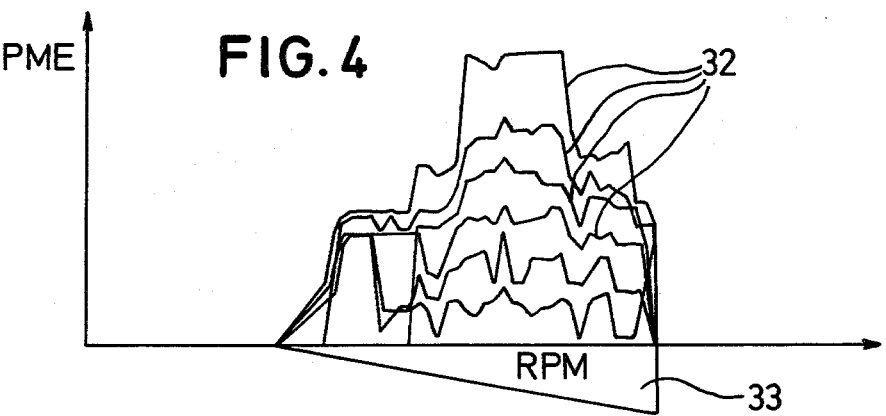
FIG. 4 shows the same diagram, statistically reduced to a few mean value curves.

The jumble of lines 31 obtainable in this manner and shown in FIG. 3 cannot be used directly for practical purposes. FIG. 4 shows how the diagram is statistically reduced to a few mean pressure curves 32, where the extension of time for each level of speed and PME is used as weighing factor.

When combining curves 32 it will be necessary to take into account the negative influence of the idling speed braking, which in FIG. 4 is shown by area 33.

When the moment characteristics at different speeds and fuel supply are known for a given engine it is possible to transfer the mean value diagram according to FIG. 4 into a fuel supply/speed diagram. In order to obtain a satisfactory reiteration positive movements only will be permitted at the fuel control means, whereby the influence of play as well as of friction and inertia in links and joints will be eliminated.

Figure 5:
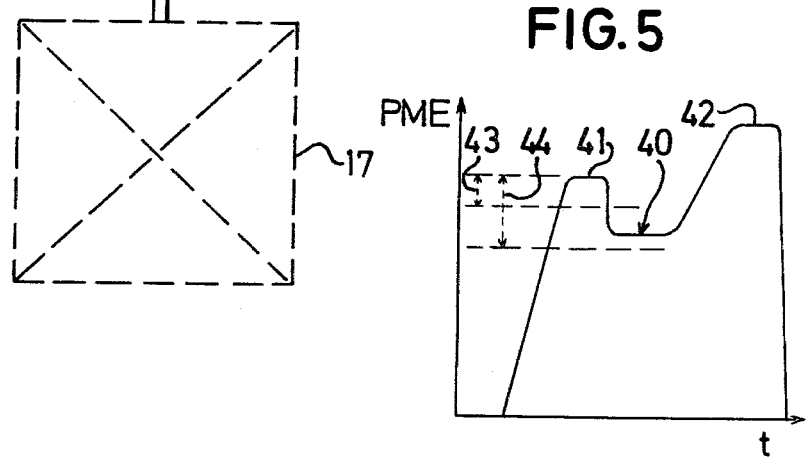
FIG. 5 is a simplified diagram showing the variations in PME during a load interval.

This is shown in FIG. 5, which is a simplified diagram, illustrating variations in PME, which may occur during one fuel supply incident.

Curve 40 shows a first peak 41 and a second peak 42, spaced apart by a valley. If the play and the friction in the transmission mechanism between the gas pedal and the member finally determining the amount of fuel supply has a magnitude corresponding to 43, it is impossible to control the upper portion of peak 41 properly, and the desired change at the engine may not be attained. If the play and the friction amount to what is indicated at 44 no change at peak 41 will be noticed.

It therefore is important that the fuel control supply means, before the first load incident in the test series, is adjusted to a zero position, where all play etc. is eliminated and that furthermore the means, during each following actuation incident, up to the point where it returns to idle running position, will be displaced in a positive direction only.

Figure 6:
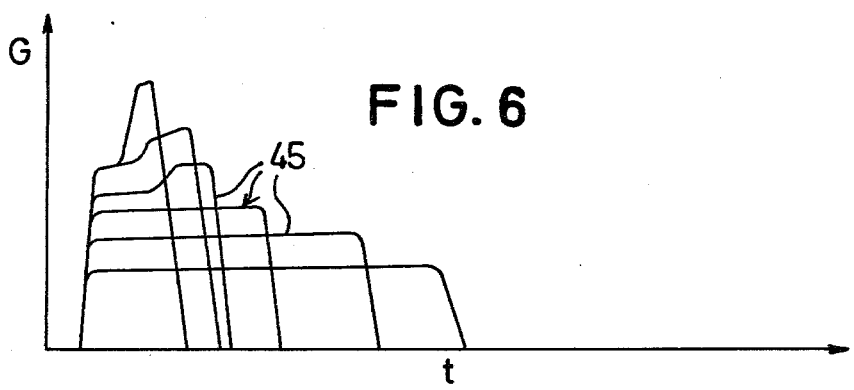
FIG. 6 shows how the mean value curves have been recalculated into a throttle/time (G/t) diagram for the actual engine.

The actual testing method, which is based upon the engine being braked mainly by its own inertia, is time-based and it will therefore be necessary to perform one further recalculation in order to provide a fuel supply means position/time diagram according to FIG. 6. This is simply established by the relation $W = \frac{1}{2} I \omega^2$, where W is the work supplied as recorded in the PME/RPM diagram,
I is the inertia of the engine, and
$\Omega$ is a linear function of the speed (radians/second).

The running of a test cycle according to FIG. 2 implies several tens of thousands of ignitions in the engine, while an operating according to a diagram according to FIG. 6 will mean some thousands of ignitions only.

It should be noted that curves 45 according to FIG. 6 clearly indicate that the fuel control means, during each load incident, will be moved in a positive direction only, up to the point where the incident is terminated. The fuel control means may be kept stationary during parts of the incident, but this will not offer any possibility for the play to influence the supply.

The method of running the engine against its own inertia and internal losses during an exhaust gas test means a considerable reduction in time. It is further evident that the present invention makes it possible to establish programs for the actuation of the fuel supply system of an engine, which ensures that the amount of gas collected for analysing during the simplified test procedure will be fully representative of any desired test cycle of established type.

What I claim is:

1. A method of analysing the exhaust gases from a vehicle internal combustion engine, comprising the steps of:
    (a) attaching a monitoring unit to the member of the engine controlling its fuel supply means,
    (b) running the engine at idling speed, disengaged from the driving transmission of the vehicle,
    (c) adjusting the actuation path between said monitoring unit and said fuel supply means to a zero position in which all play is eliminated,
    (d) during a given period of time permitting said monitoring unit to subject the engine to a series of increases in the fuel supply, above the idling speed, each increase intended to simulate a certain incident in a pre-selected traffic sequence, but not exceeding what the engine can absorb by using its inertia and internal losses as braking factors, and
    (e) displacing said fuel supply means during each incident of activity in a positive direction only responsive to oredetermined changes in effective mean pressure and speed caused by said increases in fuel supply, until the engine returns to the idling speed level.

2. The method according to claim 1, in which an arbitrary driving sequence is transformed to provide a reduced time scale, comprising:
    (a) determining the changes in effective mean pressure in relation to speed to which the engine is subjected when running through the selected cycle,
    (b) diagramming said changes in effective mean pressure in relation to speed,
    (c) statistically simplifying said diagram to obtain a small number of mean value curves, relative to the total number of curves in said diagram,
    (d) determining fuel supply means displacement in relation to time from said statistically simplified diagram, and
    (e) displacing said fuel supply means during each incident of activity in accordance with said predetermined fuel supply means displacement/time determination.

* * * * *